No. 841,518. PATENTED JAN. 15, 1907.
J. HART.
TIRE REPAIRING APPARATUS.
APPLICATION FILED AUG. 23, 1906.
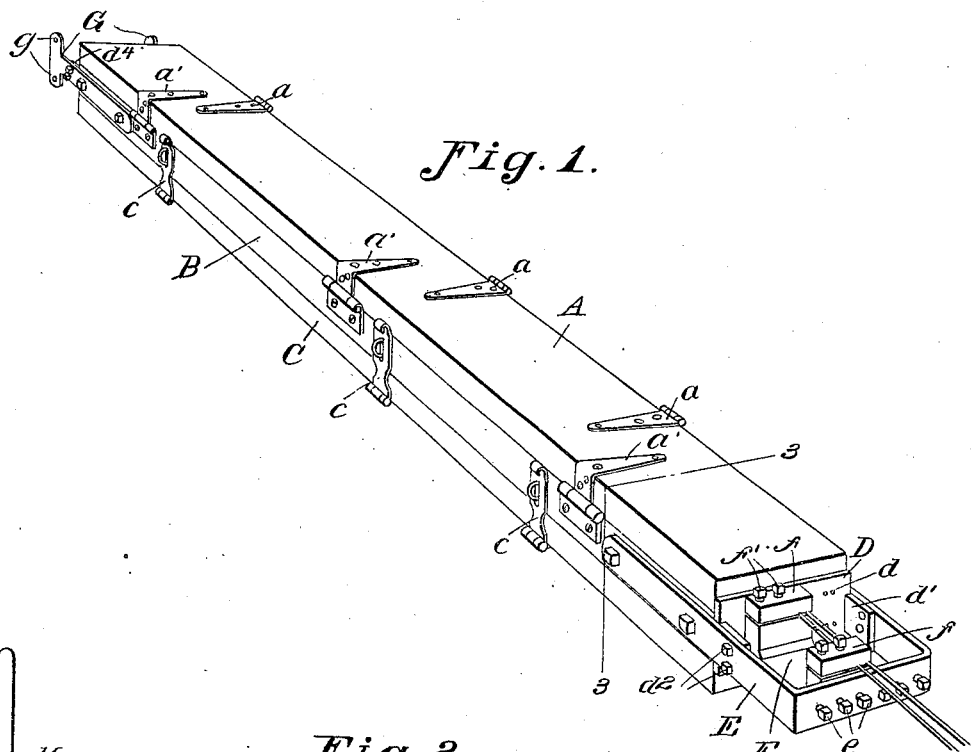
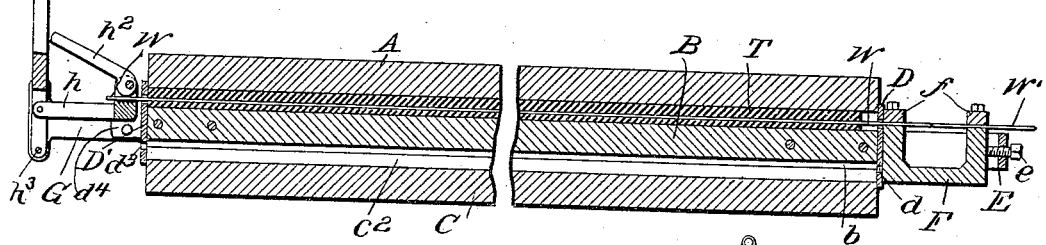
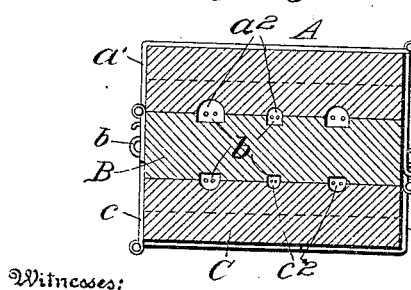
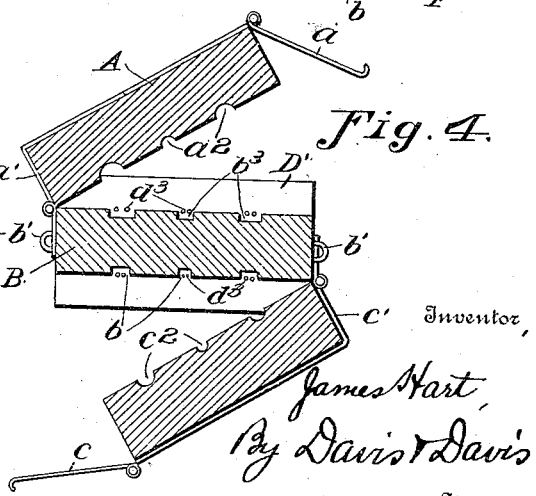
Witnesses:
L. B. Bridger
R. W. Bishop
Inventor,
James Hart,
By Davis & Davis
Attorneys.

UNITED STATES PATENT OFFICE.

JAMES HART, OF WASHINGTON, PENNSYLVANIA.

TIRE-REPAIRING APPARATUS.

No. 841,518.  Specification of Letters Patent.  Patented Jan. 15, 1907.

Application filed August 23, 1906. Serial No. 331,793.

*To all whom it may concern:*

Be it known that I, JAMES HART, a citizen of the United States of America, and a resident of Washington, county of Washington, State of Pennsylvania, have invented certain new and useful Improvements in Tire-Repairing Apparatus, of which the following is a full and clear specification, reference being had to the accompanying drawings, in which—

Figure 1 is a perspective view showing my apparatus closed upon a tire with the brazing-clamp adjusted for use; Fig. 2, a vertical longitudinal section thereof, showing in addition the pulling-lever in position at the front end of the apparatus; Fig. 3, a transverse section on the line 3 3 of Fig. 1, showing the apparatus closed; and Fig. 4, a similar view showing the apparatus open.

The object of this invention is to provide a simple and inexpensive apparatus which will greatly facilitate the withdrawal of old wires from rubber carriage-tires and at the same time permit new wires to be drawn into the tire, as more fully hereinafter set forth.

To the accomplishment of this object and such others as may hereinafter appear, the invention consists of the parts and combination of parts hereinafter fully described, and particularly pointed out in the appended claims, reference being had to the accompanying drawings, forming a part of this specification, in which the same reference characters designate like parts throughout the several views.

Referring to the drawings by reference-letters, A, B, and C designate three boards or blocks of substantially the same length and width and of a length somewhat greater than the longest carriage-tire. The top board A is hinged at one edge by hinges $a'$ to the upper face of the middle board B and is adapted to be locked down thereon by means of a series of hasps $a$ and staples $b'$. The lower board C is hinged to the opposite edge of the middle board by hinges $c'$ and is adapted to be locked against the under face of the middle board by means of suitable hasps $c$ and staples $b'$, fastened in the edge of the middle board.

In the adjacent faces of the boards are formed a series of corresponding grooves, which form, when the boards are locked together, longitudinal channels for the reception of the tires. The parts $b$ of the grooves in the middle board are preferably rectangular in cross-section, so as to receive the square edge of the tire, while the parts $a^2$ and $c^2$ of the grooves which are formed in the upper and lower boards, respectively, are rounded in cross-section to make them correspond with the convexity of the tires. The tire-receiving channels are of various sizes to accommodate the machine to various-sized tires without the employment of filling-pieces. The channels are to be of a diameter which will practically fit the tires so that there will be a slight frictional engagement with the tires throughout their length.

To prevent the tires being withdrawn when the wires are pulled out, I fasten to the forward end of the central board a plate D', which overlaps upon the ends of the upper and lower boards, covering the ends of the tire-receiving channels. In this plate coincident with each channel is formed a pair of holes $d^3$, through which the wires are passed, and to draw the wires W out of the tires I employ a lever H, pivoted on a horizontal bolt $h^3$, supported in a pair of holes $g$, formed in the end of side bars or plates G, bolted to the opposite edges of the central board. Pivotally attached to the lever is a link $h$, which carries at its free end a clamp $h^2$, adapted to grip the wires when the lever is pulled forward and to loosen and slide along the wires when the lever is swung backward for another stroke, whereby the wires may be withdrawn simply by working the lever back and forth. The tire while the wires are being withdrawn abuts at its forward end against the abutment-plate D', and the closed channel prevents the tire buckling or kinking.

The bolt $h^3$, supporting the lever, is supported in the arms G at a point below the center of the apparatus, so that the pulling-clamp will come in line with the wires in the upper series of channels. To bring the grip in line with any one of the three upper series of channels, the lever is adapted to be slid along on bolt $h^3$. When the lower series of channels are employed, the apparatus is turned over, and these lower series become for the time being the upper series of channels, and the lever and grip device must then be reversed. To do this, the bolt $h^3$ is removed and passed through the other pair of holes $g$, which have become by the reversal of the apparatus the lower holes. It will thus be observed that a feature of my invention lies in providing a reversible or invertible apparatus, the advantage of this lying in the fact that I am enabled thereby to provide for a large variety of tires without sacrificing simplicity and compactness. As will be observed, the abutment-plate D' is secured against the end of the middle board by having its side edges provided with forwardly-extending lugs $d^4$, which are bolted to the rigid arms G. At the rear end of the apparatus is fastened a yoke E, whose forwardly-extending arms are bolted rigidly to the opposite edges of the middle board. Another abutment-plate D, similar to the plate D', is bolted to the rear end of the apparatus by means of lugs $d'$, which are bolted to the side arms of the yoke by means of bolts $d^2$, said plate being provided with wire-passages $d$. The brazing-clamp F is adapted to be adjustably and removably clamped between the cross-bar of the yoke and the abutment-plate by means of a series of set-screws $e$, tapped through the said cross-bar. This brazing device F is provided at each end with a clamp-block $f$, which is adapted to be clamped down upon the main part of the device by means of bolts $f'$, whereby the projecting ends of the old wires may be clamped in juxtaposition to the ends of the new wires and be held until brazed.

When the groove or channel which is adapted to the particular tire to be operated on is selected, the apparatus is arranged so that that channel shall be uppermost. The upper board is then thrown back, and the tire is placed in its proper groove in the middle board. The rubber at the rear end of the tire is pushed back to expose the projecting ends of the old wires and is desirably held back temporarily by means of any suitable clamping device adapted to be clamped to the wires. The rear ends of the wires are then passed through the holes in the rear abutment-plate and clamped down on the brazing-clamp. The new wires are then clamped in place and are secured to the old wires by brazing or otherwise. Then the clamp on the wires which holds back the rubber is removed, and the brazing-clamp is also removed from the wires. The forward ends of the wires are then passed through the proper holes in the forward abutment-plate, after which the top board is locked down in place. Then by means of the lever and grip the wires may be readily withdrawn and the new wires at the same time pulled into the tire. Of course it is obviously not absolutely necessary to employ clamps to hold back the rubber from off the ends of the wires, and especially if the tires are already too short. It will be observed that by so combining and arranging the three members of the holder that two series of tire-receiving grooves are provided for a large number of different-sized tires may be operated upon by a single apparatus. A further feature of importance lies in the provision of the abutment-plate D', whereby it is rendered unnecessary that the tire shall be clamped throughout its length, this abutment-plate being rigidly attached to the middle member and extending beyond the opposite faces of the same far enough to overlap the adjacent ends of the outer members, but being unattached to these outer members, so that the outer members may be opened without hindrance by the abutment-plate. The abutment-plates serve also to assist in guiding and holding the members in their proper relative positions. By thus avoiding the necessity of using a clamping force to hold the tire in position in the channel I avoid the necessity of using clamping devices to clamp the members together and am enabled to use instead thereof simple hasp-and-staple or other locking devices.

A feature of special importance lies in so mounting and constructing the wire-pulling device that it may be adjusted laterally along its pivotal bolt $h^3$ to bring it in line with any pair of wire-passages and also so that it may be reversed to bring its wire-grasping jaws in alinement with either row of wire-passages. It will be observed also that the manner of supporting the brazing-clamp not only permits the clamp to be adjusted laterally to bring its jaws into line with any pair of wire-passages, but also enables it to be reversed to adapt it to either the top row of wire-passages or the lower row.

Having thus fully described my invention, what I claim, and desire to secure by Letters Patent, is—

1. In an apparatus of the class set forth, the combination of a plurality of board-like members superposed and having a series of longitudinal tire-receiving grooves between them, these grooves having different diameters and running the full length of the members, means for removably locking the members together, a rigid abutment-plate at one end covering the ends of the tire-receiving grooves and provided with wire-passages coincidently with each groove, a wire-pulling device and means for mounting it on the end of the apparatus in front of said abutment-plate, said means being adjustable to permit the wire-pulling device to be adjusted across the end of the apparatus and thus alined with any one of the tire-receiving grooves, a brazing-clamp mounted on the rear end of the apparatus and means whereby this clamp is made adjustable across the end of the apparatus to bring it into line with any one of the tire-receiving grooves.

2. In an apparatus of the class set forth, the combination of three boards or members superposed and hinged together at their edges, tire-receiving grooves of various sizes being formed between the adjacent faces of the members, these grooves being formed in the two series in different planes, arms projecting from one end of the middle member, a reversible and laterally-adjustable wire-pulling device mounted on these arms, and an abutment-plate rigidly attached to the end of the middle member and having its edges overlap the outer members, these overlapping edges being provided with wire-passages coincident with the tire-receiving passages between the members.

3. In an apparatus of the class set forth, the combination of three superimposed board-like members and means for locking them together, tire-receiving grooves being formed in the adjacent faces of the members, these grooves being of different sizes and arranged in two different planes, wire-pulling devices at one end of the members, and a laterally-adjustable and reversible brazing-clamp at the other end of the apparatus, substantially as set forth.

In testimony whereof I hereunto affix my signature, in the presence of two witnesses, this 18th day of August, 1906.

JAMES HART.

Witnesses:
   MARY L. PATTERSON,
   S. ASHBROOK.